(12) United States Patent
Choi (10) Patent No.: US 7,837,756 B2
(45) Date of Patent: Nov. 23, 2010

(54) FILTER WITH EPTFE AND METHOD OF FORMING

(75) Inventor: Kyung-Ju Choi, Louisville, KY (US)

(73) Assignee: AAF-McQuay Inc., Louisville, KY (US)

( * ) Notice: Subject to any disclaimer, the term of this patent is extended or adjusted under 35 U.S.C. 154(b) by 721 days.

(21) Appl. No.: 11/696,773

(22) Filed: Apr. 5, 2007

(65) Prior Publication Data
US 2008/0245041 A1    Oct. 9, 2008

(51) Int. Cl.
*B01D 39/02* (2006.01)
(52) U.S. Cl. .......................... 55/527; 55/487; 55/486; 55/528; 55/522; 55/524; 55/521; 95/285; 95/286; 95/287
(58) Field of Classification Search .................. 55/487, 55/486, 527, 528, 522, 524, 521; 95/285–287; 210/503–505, 508
See application file for complete search history.

(56) References Cited

U.S. PATENT DOCUMENTS

| | | | |
|---|---|---|---|
| 3,870,495 A * | 3/1975 | Dixson et al. ................. 55/489 |
| 4,025,679 A | 5/1977 | Denny | |
| 4,536,440 A * | 8/1985 | Berg .......................... 442/346 |
| 4,877,433 A | 10/1989 | Oshitari | |
| 5,057,217 A | 10/1991 | Lutz et al. | |
| 5,096,473 A | 3/1992 | Sassa et al. | |
| 5,496,396 A | 3/1996 | Allan et al. | |
| 5,507,847 A | 4/1996 | George et al. | |
| 5,783,086 A | 7/1998 | Scanlon et al. | |
| 5,843,390 A | 12/1998 | Plinke et al. | |
| 5,891,402 A | 4/1999 | Sassa et al. | |
| 5,928,414 A | 7/1999 | Wnenchak et al. | |
| 6,030,484 A | 2/2000 | Maeoka et al. | |
| 6,110,243 A | 8/2000 | Wnenchak et al. | |
| 6,214,093 B1 | 4/2001 | Nabata et al. | |
| 6,267,252 B1 * | 7/2001 | Amsler ....................... 210/490 |
| 6,334,881 B1 | 1/2002 | Giannetta et al. | |
| 6,365,532 B1 | 4/2002 | Kruszewski | |

(Continued)

FOREIGN PATENT DOCUMENTS

CA        1263089        11/1989

(Continued)

OTHER PUBLICATIONS

U.S. Patent and Trademark Office (ISA/US); International Search Report and the Written Opinion of the International Searching Authority, or the declaration; Mar. 9, 2009; pp. 1-15; U.S. Patent and Trademark Office; U.S.

*Primary Examiner*—Jason M Greene
*Assistant Examiner*—Dung Bui
(74) *Attorney, Agent, or Firm*—James E. Cole; John F. Salazar; Middleton Reutlinger (57) ABSTRACT

A filter media product and method of making the same wherein the filter media is pleatable and has at least one support scrim comprised of a melt bonded non-woven material or a fuse bonded non-woven material bonded to a layer of expanded polytetrafluoroethylene. The filter media may have a single support scrim with one or more layers and optionally may have a support scrim on both an upstream and downstream surface where both or neither support scrim is multi-layered. The filter media may have an efficiency greater than, equal to, or less than HEPA.

43 Claims, 6 Drawing Sheets

U.S. PATENT DOCUMENTS

| | | |
|---|---|---|
| 6,409,785 B1 * | 6/2002 | Smithies et al. ............... 55/486 |
| 6,409,787 B1 * | 6/2002 | Smithies et al. ............... 55/514 |
| 6,559,080 B2 | 5/2003 | Kruszewski |
| 6,808,553 B2 | 10/2004 | Kawano et al. |
| 7,138,057 B2 | 11/2006 | Debes et al. |
| 7,244,292 B2 * | 7/2007 | Kirk et al. ...................... 96/69 |
| 2003/0003298 A1 | 1/2003 | Kruszewski |
| 2003/0140606 A1 * | 7/2003 | Smithies ...................... 55/382 |
| 2003/0167742 A1 * | 9/2003 | Kahlbaugh et al. ............ 55/486 |
| 2004/0083695 A1 * | 5/2004 | Schultink et al. .............. 55/382 |
| 2005/0091947 A1 * | 5/2005 | Smithies et al. ............... 55/382 |
| 2005/0138906 A1 * | 6/2005 | Kubokawa et al. ............ 55/497 |
| 2005/0210844 A1 * | 9/2005 | Kahlbaugh et al. ............ 55/486 |
| 2006/0091066 A1 * | 5/2006 | Driml et al. ............... 210/493.1 |
| 2006/0096263 A1 * | 5/2006 | Kahlbaugh et al. ............ 55/527 |
| 2006/0242933 A1 * | 11/2006 | Webb et al. ................... 55/486 |
| 2007/0039300 A1 * | 2/2007 | Kahlbaugh et al. ............ 55/527 |
| 2007/0084776 A1 * | 4/2007 | Sasur ........................ 210/314 |
| 2007/0125703 A1 * | 6/2007 | Chapman et al. ............. 210/504 |
| 2008/0022642 A1 * | 1/2008 | Fox et al. ...................... 55/521 |
| 2008/0141636 A1 * | 6/2008 | Singh ........................... 55/428 |
| 2009/0199715 A1 * | 8/2009 | Koschak et al. ............... 95/273 |

FOREIGN PATENT DOCUMENTS

| | | |
|---|---|---|
| CA | 2015548 | 10/1990 |
| CA | 2132702 | 9/1999 |
| DE | 19833247 | 2/2000 |
| EP | 0160168 A2 | 2/1985 |
| EP | 0246917 A2 | 11/1987 |
| EP | 1098692 | 5/2001 |
| EP | 1674144 A1 | 6/2006 |
| GB | 2243091 A | 10/1991 |
| JP | 61000403 | 1/1986 |
| JP | 61000422 | 1/1986 |
| JP | 63016019 | 1/1988 |
| JP | 2063530 | 3/1990 |
| JP | 3068409 | 3/1991 |
| JP | 4045812 | 2/1992 |
| JP | 4227810 | 8/1992 |
| JP | 7126428 | 5/1995 |
| JP | 7256023 | 10/1995 |
| JP | 9253429 | 9/1997 |
| JP | 2003190721 | 7/2003 |
| WO | 9005035 A1 | 5/1990 |
| WO | 9108829 A1 | 6/1991 |
| WO | 9422553 A1 | 10/1994 |
| WO | 9604063 A1 | 2/1996 |
| WO | 9802229 A1 | 1/1998 |
| WO | 9807361 A1 | 2/1998 |
| WO | 9911355 | 3/1999 |
| WO | 0062900 A1 | 10/2000 |

* cited by examiner

FILTER WITH EPTFE AND METHOD OF FORMING

FIELD OF THE INVENTION

The present invention relates to filters, such as gas or air filters, and methods of forming filters.

BACKGROUND OF THE INVENTION

It is known to provide filter media having a relatively high efficiency rating commonly referred to as a High Efficiency Particulate Air (HEPA, 99.97% efficient at a 0.3 µm particle size) by having expanded polytetrafluoroethylene (ePTFE) incorporated within the filter media. However, the scrim or support materials used in making the ePTFE containing filter media have often caused a restriction of the process steps associated with making the ePTFE filter media to prevent damage to the ePTFE during manufacturing and/or have typically not yielded desired filter media characteristics such as pleatability or stiffness. Additionally, providing an ePTFE containing filter media having an efficiency less than HEPA, reducing the resulting pressure drop across the filter media, is often desirable.

BRIEF DESCRIPTION OF THE DRAWING FIGURES

The figures herein disclose several embodiments of the present invention and are not to be interpreted as limiting the scope of the present invention.

DETAILED DESCRIPTION OF THE PREFERRED EMBODIMENTS

It is to be understood that various changes can be made by one skilled in the art in one or more of the several parts and in one or more of the several steps in the apparatus and method disclosed herein without departing from the scope or spirit of the present invention.

A filter media is provided having an ePTFE layer bonded to at least one scrim layer. Typically, when achieving a desired efficiency for residential or other non-industrial applications, a resulting pressure drop across the filter media is too high for such applications. Embodiments disclosed herein provide an acceptable pressure drop across the filter media for such non-industrial applications. It has been surprisingly found that a filter media having a carded pleatable scrim and efficiency between about 70% and 90%, advantageously approximately 80%, may have a pressure drop across the filter media of up to 50% less, or even more, than a traditional filter of similar efficiency. In one aspect, a pleatable self supporting filter media is comprised of staple fibers, providing a cost benefit over the use of spun-laid fibers. Advantageously, the filter media has at least one carded self supporting scrim layer wherein carding of the fibers is accomplished by combing, brushing, or by other means providing substantially aligned fibers.

Figure 1A:
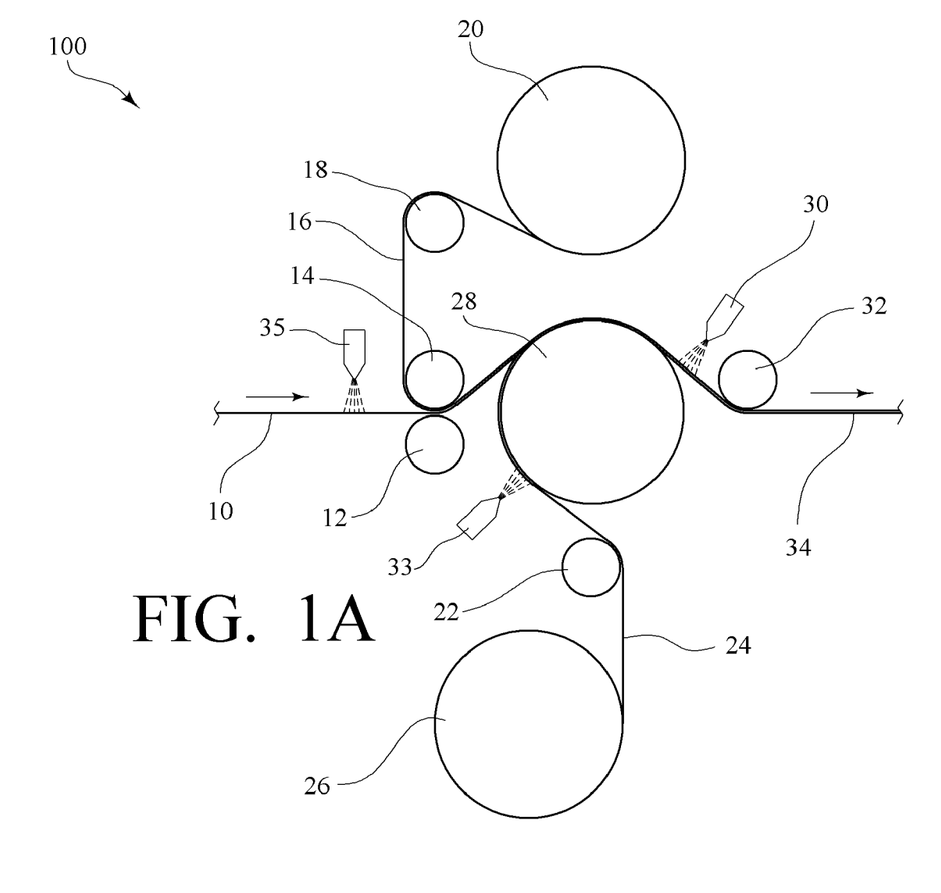
FIG. 1A is a side elevational view of a schematic flow diagram of equipment arranged to carry out steps to produce an expanded polytetrafluoroethylene containing filter media having a first surface bonded to a first support scrim and a second surface bonded to a second support scrim.

FIG. 1A shows schematic flow diagram 100 producing an expanded polytetrafluoroethylene containing filter media 34. Lower scrim supply roll 26 feeds a first scrim material 24 onto guide roller 22 which guides first scrim material 24 onto heated bonding roller 28. Optionally, sprayer 33 applies a powdered polymeric material such as polyethylene to an inner surface of first scrim material 24. Alternatively, the powdered polymeric material could be applied to lower surface of porous ePTFE film 10. The application of the powdered polymeric material provides bonding between porous ePTFE film 10 and the support scrim when such bonding is desirable. Upper scrim supply roll 20 feeds a second scrim material 16 onto guide roller 18 which guides second scrim material 16 between guide roller 14 and nip roller 12. A porous ePTFE film or sheet 10 is fed between guide roller 14 and nip roller 12 and has a first and second surface wherein the second surface becomes adjacent second support scrim 16 at guide roller 14. Optionally, sprayer 35 applies a powdered polymeric material such as polyethylene to the second surface of porous ePTFE film 10, or alternatively to the surface of scrim material 16 that contacts porous ePTFE film 10. Both second support scrim 16 and porous ePTFE film 10 are fed adjacently onto heated bonding roller 28 wherein the first surface of porous ePTFE film 10 contacts first support scrim 24. For a portion of a revolution of heated bonding roller 28, first support scrim 24 is in contact with heated bonding roller 28 and the first surface of porous ePTFE film 10 and second support scrim 16 contacts the second surface of porous ePTFE film 10 wherein at least portions of first support scrim 24 and second support scrim 16 are partially melted or softened to an extent to provide a bond to porous ePTFE film 10. Shortly after exit of bonded first support scrim 24, porous ePTFE film 10, and second support scrim 16 from heated bonding roller 28 the composite passes by cooling jet 30. Typically, cooling jet 30 supplies cool air or other cooling fluid to fluid cool the composite of first support scrim 24, porous ePTFE film 10, and second support scrim 16 to a point where the softened or partially melted portions of first support scrim 24 and second support scrim 16 are hardened to form a multilayer filter media 34. Media 34 comprises porous ePTFE film 10 in a middle layer between first support scrim 24 and second support scrim 16. A guide roller 32 is positioned so that media 34 is deflected, upon exit from roller 28, in such a way that it maintains a desired length of contact with the circumference of heated bonding roller 28 to properly bond first support scrim 24, porous ePTFE film 10, and second support scrim 16 to form multilayered filter media 34 and also serves to guide multilayer filter media 34 to a subsequent pleating zone.

In one embodiment, first support scrim 24 and/or second support scrim 16 are comprised of carded non-woven fibrous materials such as melt bonded non-woven material or fuse bonded carded non-woven materials. The use of carded non-woven fibrous materials provide a cost advantage over the use of other non-wovens and woven fibrous materials. Advantageously, multilayer filter media 34 has sufficient structure to be self supporting. Multilayer filter media 34 may have a Gurley stiffness of at least 500 mg.

First support scrim 24 and/or second support scrim 16 may have single component fibers, bicomponent fibers, or a mixture of both single component fibers and bicomponent fibers. In a preferred embodiment, first support scrim 24 and/or second support scrim 16 have bicomponent fibers in a range of 30% to 100% with the remainder being single component fibers. The bicomponent fibers have a high melting portion and a low melting portion in a preferred aspect the high melting portion is polyester and the low melting portion is polyethylene or co-polyester. First support scrim 24 and/or second support scrim 16 may be multilayered with a first and second layer where the first layer is bonded to porous ePTFE film 10 and the second layer is bonded to the first layer. In one embodiment of a multilayered scrim, the first layer has bicomponent fibers with a polyester and a polyethylene and the second layer has bicomponent fibers with a polyester and a co-polyester. In the process of bonding first support scrim 24 and second support scrim 16 to porous ePTFE film 10 as described above, at least a portion of the fibers in each scrim layer are partially melted or softened to an extent which will provide the desired bond to film 10.

Typically, porous ePTFE film 10 has much smaller pores or void spaces than either support scrim 24 or second support scrim 16. Thus, it is the size of the pores in porous ePTFE film 10 which typically defines the efficiency of multilayer filter media 34, wherein the efficiency is the percentage of particles over a given size that are filtered out of a gas stream passed therethrough. However, in the instances wherein filter media 34 has a lower efficiency (<=HEPA), the scrim may define the efficiency of filter media 34. The size of the pores in porous ePTFE film 10 is proportional to the extent of expansion or stretching of porous ePTFE film 10. Typically, porous ePTFE film 10 is sequentially stretched, longitudinally then latitudinally, to an extent as to provide a desired efficiency of filter media 34. However, porous ePTFE film 10 may be expanded to an extent wherein the pore size therein is larger than the pore size of either support scrim 24. Filter media 34 may have an efficiency of at most 99.97% at 0.3µ (<=HEPA), or of at least 99.97% at 0.3µ (>=HEPA), greater than about 40% and less than HEPA, or in a range of 40% to 99.999995% (ULPA) at a most penetrating particle size. Filter media 34 may have efficiency between about 70% and 90%, advantageously approximately 80%. Typically, filter media 34 has permeability in a range of 2 to 400 cfm/sq ft as measured with an air permeability measuring instrument, such as a Frazier, Textest, or other instrument as known in the art.

Figure 1B:
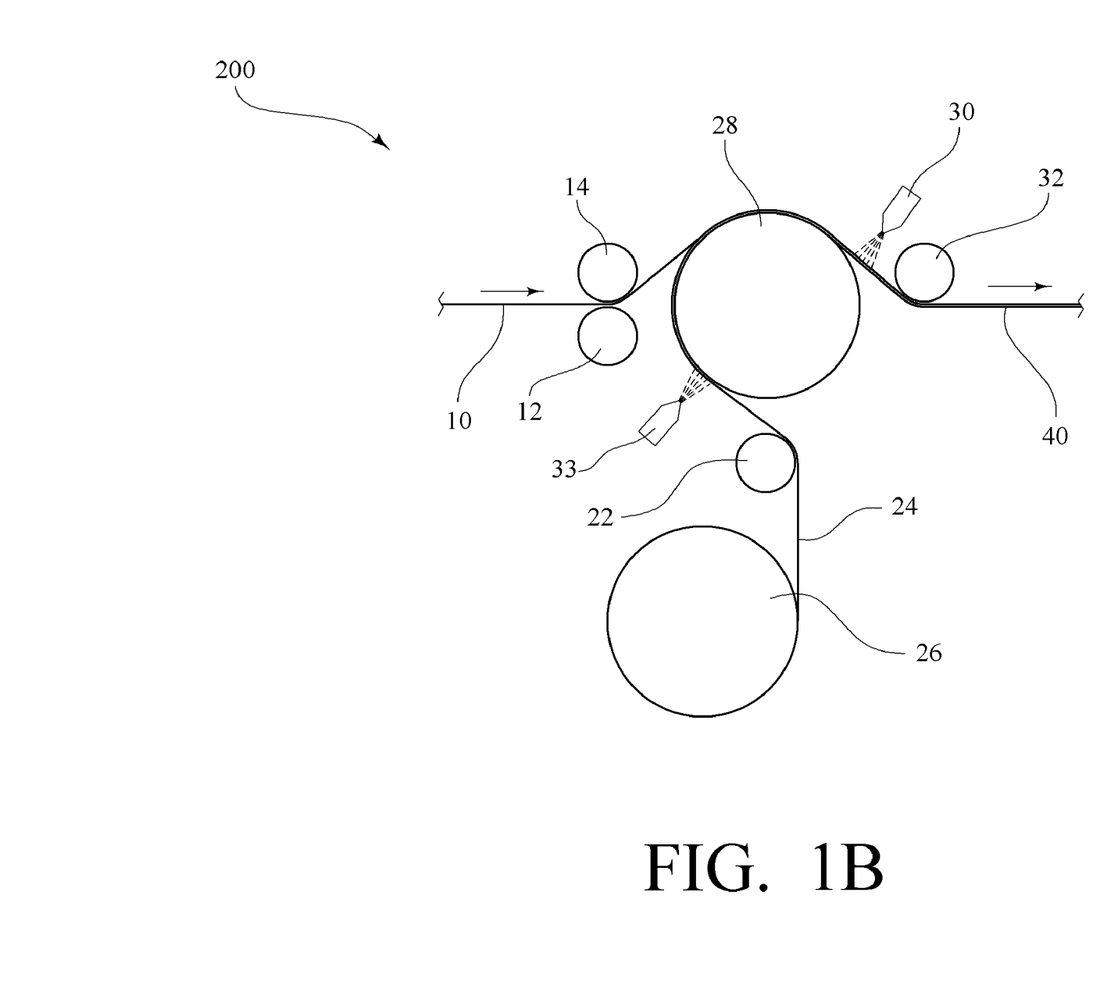
FIG. 1B is a side elevational view of a schematic flow diagram of equipment arranged to carry out steps to produce an expanded polytetrafluoroethylene containing filter media having a first surface bonded to a first support scrim.

FIG. 1B shows schematic flow diagram 200 of an apparatus for producing an expanded polytetrafluoroethylene containing filter media 40. Lower scrim supply roll 26 feeds a scrim material 24 onto guide roller 22 which guides scrim material 24 onto heated bonding roller 28. A porous ePTFE film or sheet 10 is fed between guide roller 14 and nip roller 12 and has a first and second surface wherein the first surface of porous ePTFE film 10 becomes adjacent support scrim 24 on heated bonding roller 28. Optionally, sprayer 33 applies a powdered polymeric material such as polyethylene to an inner surface of first scrim material 24, or alternatively to lower surface of porous ePTFE film 10. For a portion of a revolution of heated bonding roller 28, support scrim 24 comes into contact with heated bonding roller 28 and the first surface of porous ePTFE film 10, wherein at least a portion of the fibers in support scrim 24 are partially melted or softened to an extent to provide a bond to porous ePTFE film 10. Shortly after exit of bonded support scrim 24 and porous ePTFE film 10 from heated bonding roller 28, the composite passes by cooling jet 30. Typically, cooling air jet 30 supplies cool air or other cooling fluid to cool the composite of support scrim 24 and porous ePTFE film 10 to a point where the softened or melted portions of support scrim 24 are hardened forming multilayer filter media 40 having porous ePTFE film 10 bonded to support scrim 24. Guide roller 32 is positioned so that media 40 is deflected in such a way upon exit from roller 28 that it maintains a desired length of contact with the circumference of heated bonding roller 28 to properly bond support scrim 24 and porous ePTFE film 10 to form multilayer filter media 40, and also serves to guide multilayer filter media 40 to a subsequent pleating zone.

Advantageously, support scrim 24 is comprised of carded non-woven fibrous materials such as melt bonded carded non-woven material or fuse bonded carded non-woven materials. Filter media 40 may have sufficient structure to be self supporting and advantageously has a Gurley stiffness of at least 500 mg. Support scrim 24 may have single component fibers, bicomponent fibers, or a mixture of both single component fibers and bicomponent fibers. In a preferred embodiment, support scrim 24 has bicomponent fibers in a range of 30% to 100% with the remainder being single component fibers. In a preferred aspect the high melting portion is polyester and the low melting portion is polyethylene or copolyester. Support scrim 24 may be multilayered with a first and second layer where the first layer is bonded to porous ePTFE film 10 and the second layer is bonded to the first layer. In one embodiment of a multilayered scrim, the first layer has bicomponent fibers with a polyester and a polyethylene and the second layer has bicomponent fibers with a polyester and a co-polyester. Filter media 40 may have an efficiency of at most 99.97% at 0.3µ (<=HEPA), at least 99.97% at 0.3µ (>=HEPA), greater than about 40% and less than HEPA, or in a range of 40% to 99.999995% at a most penetrating particle size. Typically, filter media 40 has a permeability in a range of 2 to 400 cfm/sq ft. Advantageously, filter media 40 has sufficient structure to be self supporting with a Gurley stiffness of at least 500 mg.

Figure 1C:
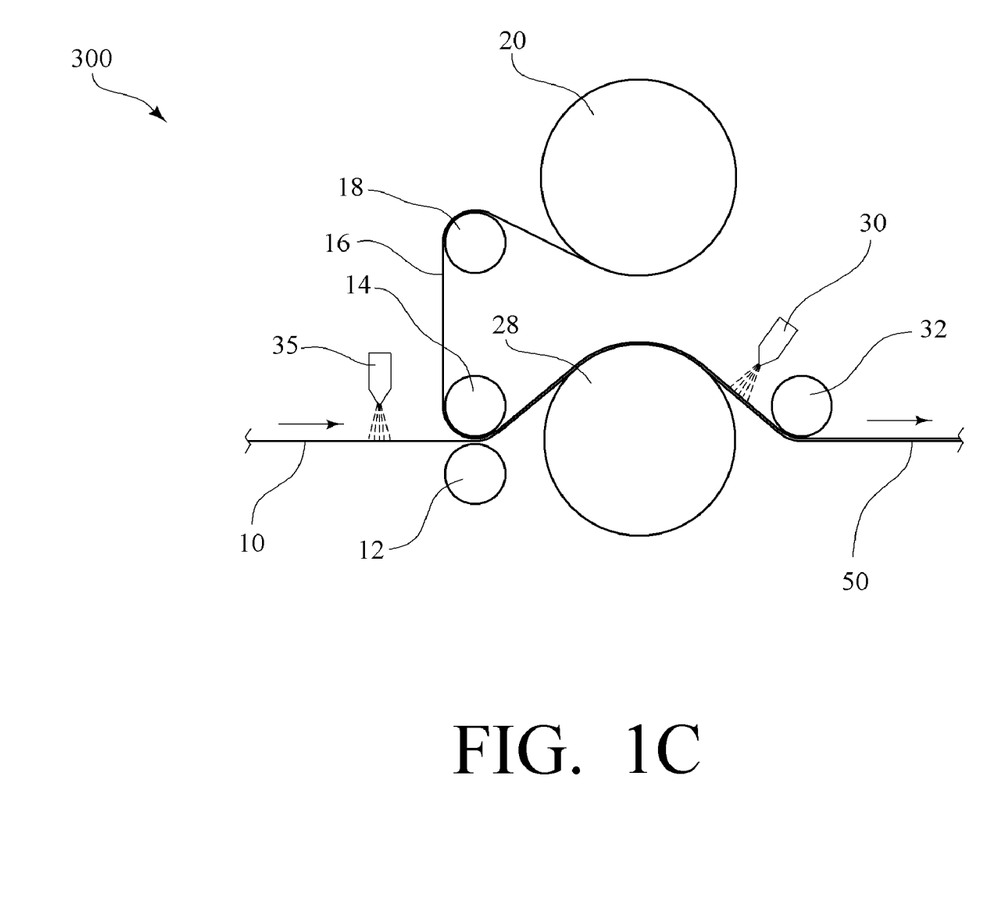
FIG. 1C is a side elevational view of a schematic flow diagram of equipment arranged to carry out steps to produce an expanded polytetrafluoroethylene containing filter media having a second surface bonded to a first support scrim.

FIG. 1C shows schematic flow diagram 300 producing an expanded polytetrafluoroethylene containing filter media 50. Upper scrim supply roll 20 feeds a scrim material 16 onto guide roller 18 which guides scrim material 16 between guide roller 14 and nip roller 12. A porous ePTFE film or sheet 10 is fed between guide roller 14 and nip roller 12 and has a first and second surface wherein the second surface becomes adjacent support scrim 16 at guide roller 14. Optionally, sprayer 35 applies a powdered polymeric material such as polyethylene to the second surface of porous ePTFE film 10, or alternatively to the surface of scrim material 16 that contacts porous ePTFE film 10. Both support scrim 16 and porous ePTFE film 10 are fed adjacently onto heated bonding roller 28 wherein the first surface of porous ePTFE film 10 becomes adjacent heated bonding roller 28. For a portion of a revolution of heated bonding roller 28, the first surface of porous ePTFE film 10 is adjacent heated bonding roller 28 and support scrim 16 is adjacent the second surface of porous ePTFE film 10 wherein at least a portion of the fibers in support scrim 16 are partially melted or softened to an extent to provide a bond to porous ePTFE film 10. Upon separation of porous ePTFE film 10 and support scrim 16 from heated bonding roller 28 is cooling jet 30. Typically, cooling jet 30 supplies cool air or other cooling fluid cooling porous ePTFE film 10 and support scrim 16 to a point where the softened or partially melted portions of support scrim 16 are hardened forming filter media 50 having porous ePTFE film 10 and support scrim 16. Guide roller 32 is positioned about heated bonding roller 28 to provide a desired contacting circumference of heated bonding roller 28 with porous ePTFE film 10 and support scrim 16 and to guide filter media 50 to a pleating zone.

Advantageously, support scrim 16 is comprised of carded non-woven fibrous materials such as melt bonded carded non-woven material or fuse bonded carded non-woven materials. Advantageously, filter media 50 has sufficient structure to be self supporting and more advantageously has a Gurley stiffness of at least 500 mg. Support scrim 16 may have single component fibers, bicomponent fibers, or a mixture of both single component fibers and bicomponent fibers. In a preferred embodiment, support scrim 16 has bicomponent fibers in a range of 30% to 100% with the remainder being single component fibers. In a preferred aspect the high melting portion is polyester and the low melting portion is polyethylene or co-polyester. Support scrim 16 is optionally multilayered with a first and second layer where the first layer is bonded to porous ePTFE film 10 and the second layer is bonded to the first layer. In one embodiment of a multilayered scrim, the first layer has bicomponent fibers with a polyester and a polyethylene and the second layer has bicomponent fibers with a polyester and a co-polyester. Filter media 50 may have an efficiency of at most 99.97% at 0.3μ (<=HEPA), at least 99.97% at 0.3μ (>=HEPA), greater than about 40% and less than HEPA, or in a range of 40% to 99.999995% (ULPA) at a most penetrating particle size. Typically, filter media 50 has a permeability in a range of 2 to 400 cfm/sq ft.

Figure 2A:
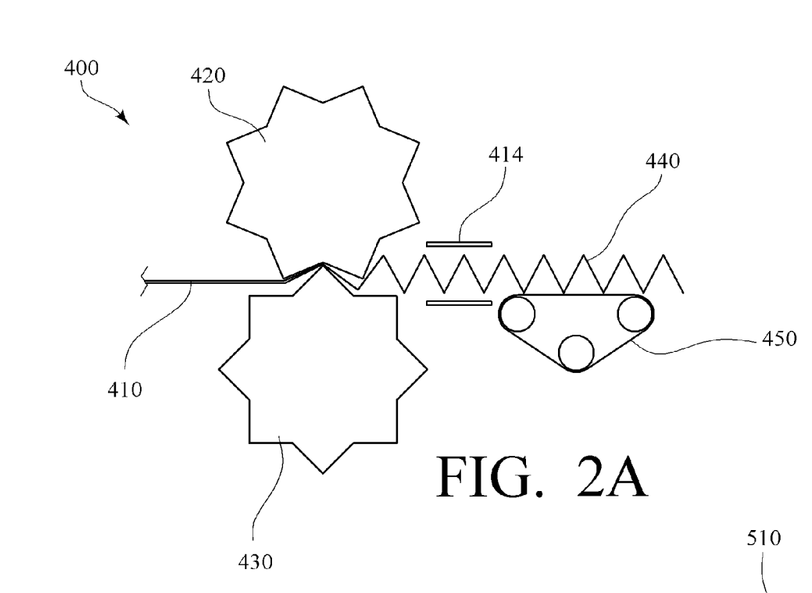
FIG. 2A is a side elevational view of a schematic flow diagram of equipment arranged to form pleats with gear wheels in the expanded polytetrafluoroethylene containing filter media produced by the processes of FIGS. 1A-1C.

FIG. 2A shows a schematic flow diagram of process 400 arranged to form pleats in the expanded polytetrafluoroethylene containing filter media 410 produced by the processes of FIGS. 1A-1C or the like. This method includes the steps of feeding a longitudinally extending continuous flat sheet of porous filter media 410 from a supply zone or directly from a process of making such as disclosed in FIGS. 1A-1C. Porous filter media 410 can be any one of several materials as above described, including ePTFE with a single scrim, single or multi layered, or a scrim material joined to a first and second surface where the second scrim may be single or multilayered. Filter media 410 is fed between a pair of cooperating gear pleating wheels 420 and 430 each having a star shaped periphery. The periphery of gears 420 and 430 cooperate to respectively engage filter media 410 to form valleys and crests in filter media 410 to produce pleated filter media 440. Optionally, filter media 440 can be heated to aid in the formation of fixed valleys and crests defining pleats in pleated filter media 440. Heating can be accomplished by heating upper gear 420 and lower gear 430, with heat plates 414, or both. Filter media 440 then is fed on an appropriate endless belt conveyor 450 moving at a preselected speed, a slower speed than the speed at which filter media 410 is fed to between gears 420 and 430. Filter media 440 conveyed thereto is caused to fold into a plurality of pleats, providing the aforementioned crests and valleys.

Figure 2B:
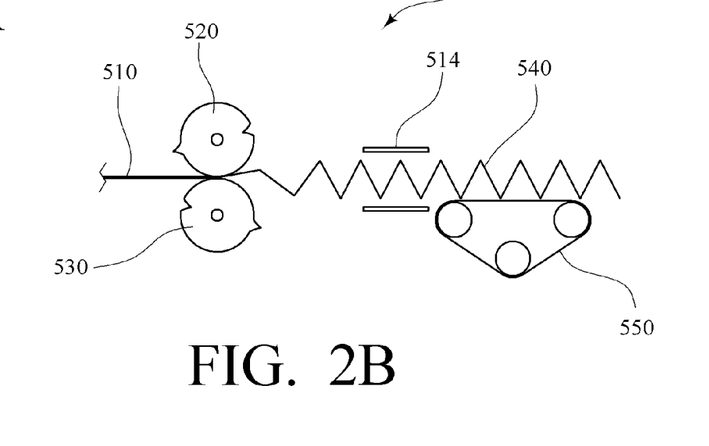
FIG. 2B is a side elevational view of a schematic flow diagram of equipment arranged to form pleats with scoring wheels in the expanded polytetrafluoroethylene containing filter media produced by the processes of FIGS. 1A-1C.

FIG. 2B shows a schematic flow diagram of process 500 arranged to form pleats in the expanded polytetrafluoroethylene containing filter media 510 produced by any one of the processes of FIGS. 1A-1C or the like. This method includes the steps of feeding a longitudinally extending continuous flat sheet of porous filter media 510 from a supply zone or directly from a process of making such as disclosed in FIGS. 1A-1C. Porous filter media 510 can have ePTFE with a single scrim, single or multi layered, or a scrim material joined to a first and second surface where the second scrim may be single or multilayered. Filter media 510 is fed between a pair of cooperating scoring wheels 520 and 530, each having a periphery with at least one "V" shaped indentation and at least one "V" shaped projection. The at least one indentation in upper scoring wheel 520 cooperates with the at least one projection in lower scoring wheel 530 and the at least one projection in upper scoring wheel 520 cooperates with the at least one indentation in lower scoring wheel 530 for each rotation of scoring wheels 520 and 530. Optionally, filter media 540 can be heated to aid in the formation of transversely extending score lines in filter media 510. Heating can be accomplished by heating upper scoring wheel 520 and lower scoring wheel 530, with heat plates 514, or both. Filter media 540 then is fed on an appropriate endless belt conveyor 550 moving at a preselected speed, a slower speed than the speed at which filter media 510 is fed to between scoring wheels 520 and 530. Filter media 540 conveyed thereto is caused to fold into a plurality of pleats, providing crests and valleys.

Figure 2C:
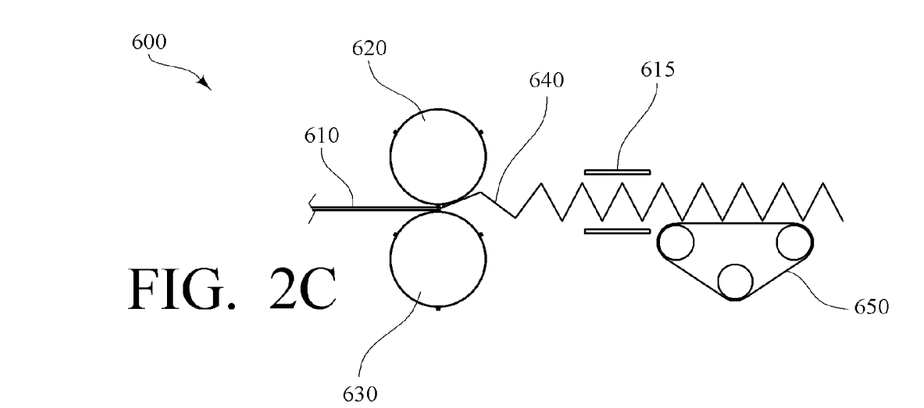
FIG. 2C is a side elevational view of a schematic flow diagram of equipment arranged to form pleats with alternative scoring wheels in the expanded polytetrafluoroethylene containing filter media produced by the processes of FIGS. 1A-1C.

FIG. 2C shows a schematic flow diagram of process 600 arranged to form pleats in the expanded polytetrafluoroethylene containing filter media 610 produced by any one of the processes of FIGS. 1A-1C or the like. This method includes the steps of feeding a longitudinally extending continuous flat sheet of porous filter media 610 from a supply zone or directly from a process of making such as disclosed in FIGS. 1A-1C. Porous filter media 610 can have ePTFE with a single scrim, single or multi layered, or a scrim material joined to a first and second surface where the second scrim may be single or multilayered. Filter media 610 is fed between a pair of cooperating scoring wheels 620 and 630, each having a periphery with at least one projection. Advantageously, the at least one projection in upper scoring wheel 620 cooperates with a pliable or softened material in lower scoring wheel 630 and the at least one projection in lower scoring wheel 630 cooperates with a pliable or softened material in upper scoring wheel 620 for each rotation of scoring wheels 620 and 630. Optionally, filter media 640 can be heated to aid in the formation of transversely extending score lines in filter media 640. Heating can be accomplished by heating upper scoring wheel 620 and lower scoring wheel 630, with heat plates 615, or both. Scored filter media 640 then is fed onto an appropriate endless belt conveyor 650 moving at a preselected speed, a slower speed than the speed at which filter media 610 is fed to between scoring wheels 620 and 630. Filter media 640 conveyed thereto is caused to fold into a plurality of pleats, providing crests and valleys. It is to be understood that the geometry and configuration of the scores can be varied providing desirable pleat crests, valleys, and flanks.

Figure 2D:
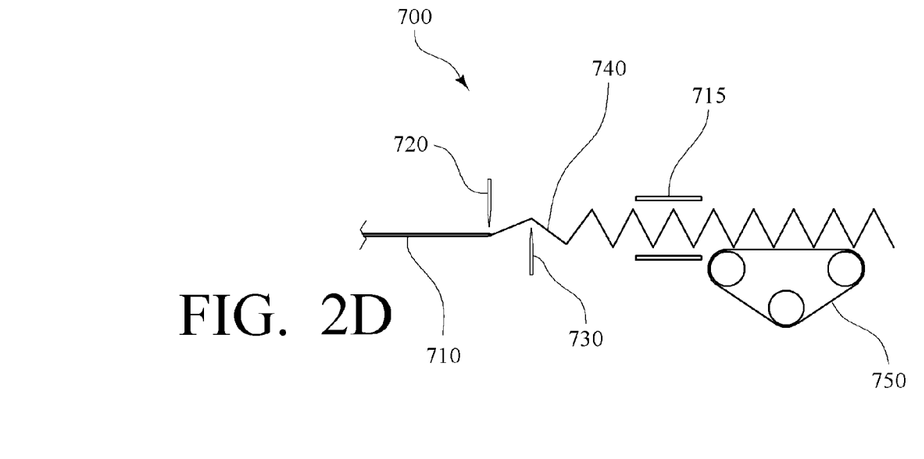
FIG. 2D is a side elevational view of a schematic flow diagram of equipment arranged to form pleats with knives in the expanded polytetrafluoroethylene containing filter media produced by the processes of FIGS. 1A-1C.

FIG. 2D shows a schematic flow diagram of process 700 arranged to form pleats in the expanded polytetrafluoroethylene containing filter media 710 produced by any one of the processes of FIGS. 1A-1C or the like. This method includes the steps of feeding a longitudinally extending continuous flat sheet of porous filter media 710 from a supply zone or directly from a process of making such as disclosed in FIGS. 1A-1C.

Porous filter media 710 can have ePTFE with a single scrim, single or multi layered, or a scrim material joined to a first and second surface where the second scrim may be single or multilayered. Filter media 710 is fed between a pair of reciprocating knives 720 and 730, offset from one another and transversely extending filter media 710. Suitably spaced knives 720 and 730 on opposed surfaces of filter media 710 serve to score and pleat the flat sheet of filter media 710 in longitudinally spaced, transversely extending lines as media 710 is passed therethrough with longitudinally spaced score lines extending transversely between the opposed, spaced longitudinally extending edges of filter media 710 and with the longitudinally spaced score lines on one face of filter media 710 being offset from the score lines on the other or opposite face of filter media 710. Advantageously, reciprocating knives 720 and 730 are heated to aid in the formation of transversely extending score lines in filter media 710, with heat plates 715, or both. Scored filter media 740 then is fed onto an appropriate endless belt conveyor 750 moving at a preselected speed, a slower speed than the speed at which filter media 710 is fed to between scoring knives 720 and 730. Filter media 740 conveyed thereto is caused to fold into a plurality of pleats, providing crests and valleys. It is to be understood that other types of apparatus can be employed in addition to those schematically disclosed herein to accomplish the novel steps herein described.

Figure 3:
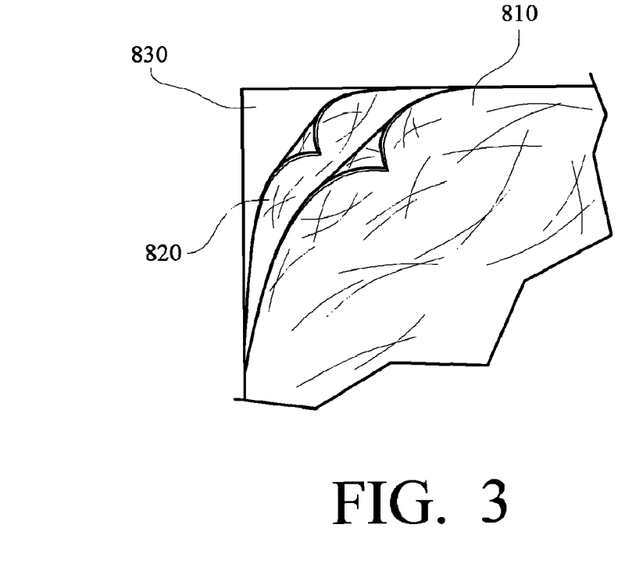
FIG. 3 is a front view of the filter media produced by the processes of FIGS. 1B and 1C having a portion of the layers separated.

FIG. 3 shows filter media 800 produced by the processes of FIGS. 1B and 1C or the like having a portion of the layers separated. Filter media 800 has a layer of porous ePTFE film 830 with a first scrim on a first surface. The first scrim shown here is a multilayer scrim having layers 820 and 810. Advantageously, first support scrim layers 810 and 820 are comprised of carded non-woven fibrous materials such as melt bonded carded non-woven material or fuse bonded carded non-woven materials. Advantageously, filter media 800 has sufficient structure to be self supporting and has a Gurley stiffness of at least 500 mg. Support scrim layers 810 and 820 may have single component fibers, bicomponent fibers, or a mixture of both single component fibers and bicomponent fibers. In one embodiment, scrim layers 810 and 820 have bicomponent fibers in a range of 30% to 100% with the remainder being single component fibers. The bicomponent fibers have a high melting portion and a low melting portion in a preferred aspect the high melting portion is polyester and the low melting portion is polyethylene or co-polyester. In a preferred embodiment of the multilayered scrim, layer 820 has bicomponent fibers with a polyester and a polyethylene and layer 810 has bicomponent fibers with a polyester and a copolyester. Embodiments of filter media 800 having a higher efficiency, porous ePTFE film 830 has much smaller pores or void spaces than both scrim layers 820 and 810. Thus, the extent of expansion or stretching of porous ePTFE film 830 is proportional to the efficiency of filter media 800. Embodiments of filter media 800 having a lower efficiency, scrim layers 820 and 810 may have a smaller pore size than ePTFE film 830 and define the efficiency of filter media 34. Filter media 800 may have an efficiency of at most 99.97% at 0.3μ (<=HEPA), at least 99.97% at 0.3μ (>=HEPA), greater than about 40% and less than HEPA, or in a range of 40% to 99.999995% at a most penetrating particle size, depending upon the desired application of filter media 800. Typically, filter media 800 has a permeability in a range of 2 to 400 cfm/sq ft.

Scrim layers 820 and 810 may be either on an upstream or downstream surface of ePTFE layer 830. Having scrim layers 820 and 810 on an upstream surface provides for a thickness having void spaces which increases the holding capacity of filter media 800. Conversely, having scrim layers 820 and 810 on a downstream surface provides for the ability to clean filter media 800 by back pulsing or shaking. Back pulse cleaning is accomplished by temporarily reversing the flow of the fluid passing through filter media 800 to dislodge accumulated material from ePTFE layer 830. Alternatively or additionally, filter media 800 may be shaken to dislodge accumulated material from ePTFE layer 830. Shaking and/or back pulsing are effective cleaning methods when scrim layers 810 and 820 are on a downstream surface since the accumulated materials are relatively readily separated from ePTFE membrane 830 with ePTFE's low propensity to stick to or hold the accumulated materials. The enhanced cleanability allows filter 800 to be repeatedly cleaned.

Figure 4:
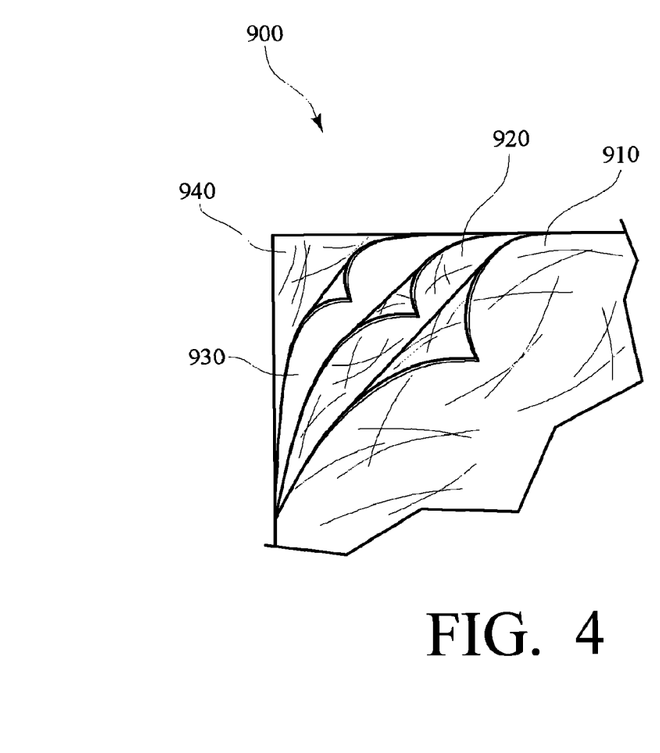
FIG. 4 is a front view of the filter media produced by the process of FIG. 1A having a portion of the layers separated.

FIG. 4 shows filter media 900 produced by the process of FIG. 1A or the like having a portion of the layers separated. Filter media 900 has a layer of porous ePTFE film 930 with a first scrim on a first surface and a second scrim on a second surface. The first scrim shown here is a multilayer scrim having layers 920 and 910. Advantageously, first support scrim layers 910 and 920 are comprised of carded non-woven fibrous materials such as melt bonded carded non-woven material or fuse bonded carded non-woven materials. Second support scrim 940 is comprised of carded non-woven fibrous materials such as melt bonded carded non-woven material or fuse bonded carded non-woven materials. Even though second support scrim 940 is shown as having a single layer it is to be understood that second support scrim 940 may be multilayered and may be comprised of the same or different materials as the first support scrim having layers 920 and 910. Advantageously, filter media 900 has sufficient structure to be self supporting and a Gurley stiffness of at least 500 mg. Support scrim layers 910, 920 and 940 may have single component fibers, bicomponent fibers, or a mixture of both single component fibers and bicomponent fibers. In one embodiment, scrim layers 910 and 920 have bicomponent fibers in a range of 30% to 100% with the remainder being single component fibers. The bicomponent fibers have a high melting portion and a low melting portion, in a preferred aspect the high melting portion is polyester and the low melting portion is polyethylene or co-polyester. In a preferred embodiment of the multilayered scrim, layer 920 has bicomponent fibers with a polyester and a polyethylene and layer 910 has bicomponent fibers with a polyester and a co-polyester. In a preferred embodiment of the single layered scrim 940, layer 940 has bicomponent fibers with a polyester and a polyethylene. Filter media 900 may have an efficiency of at most 99.97% at 0.3μ (<=HEPA), at least 99.97% at 0.3μ (>=HEPA), greater than about 40% and less than HEPA, or in a range of 40% to 99.999995% at a most penetrating particle size, depending upon the desired application of filter media 900. Typically, filter media 900 has a permeability in a range of 2 to 400 cfm/sq ft.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A fluid filter including an upstream and downstream surface and being capable of obtaining a desirable minimum efficiency at a low pressure drop having a media comprising:

a first carded relatively open pleatable support scrim comprised of a melt bonded non-woven material or a fuse bonded non-woven material with greater than 40% bicomponent fibers, said first support scrim having a Gurley stiffness of at least 500 mg;

a layer of expanded polytetrafluoroethylene having a first surface bonded to said first support scrim; and, said media being pleated and self-supporting.

2. The fluid filter of claim 1 having a second support scrim bonded to a second surface of said layer of expanded polytetrafluoroethylene.

3. The fluid filter of claim 2 wherein said second support scrim is comprised of a melt bonded non-woven material or a fuse bonded non-woven material.

4. The fluid filter of claim 1 wherein said fluid filter is self supporting.

5. The fluid filter of claim 4 wherein said first support scrim having bicomponent fibers in a range of 30% to 100% has a remainder of fibers being single component fibers.

6. The fluid filter of claim 5 wherein said bicomponent fibers of said first support scrim have high melting portion and low melting portion, said high melting portion being polyester and low melting portion being polyethylene or co-polyester.

7. The fluid filter of claim 6 wherein said bicomponent fibers of said first support scrim have a polyester and a co-polyester.

8. The fluid filter of claim 6 wherein said bicomponent fibers of said first support scrim have a polyester and a polyethylene.

9. The fluid filter of claim 1 wherein said first support scrim is multilayered having a first and second layer, said first layer being bonded to said expanded polytetrafluoroethylene, said second layer being bonded to said first layer.

10. The fluid filter of claim 9 wherein said first layer of said first support scrim has bicomponent fibers with a polyester and a polyethylene and said second layer of said first support scrim has bicomponent fibers with a polyester and a co-polyester.

11. The fluid filter of claim 2 wherein said second support scrim has bicomponent fibers.

12. The fluid filter of claim 11 wherein said bicomponent fibers of said second support scrim have high melting portion and low melting portion, said high melting portion being polyester and low melting portion being polyethylene or co-polyester.

13. The fluid filter of claim 12 wherein said bicomponent fibers of said second support scrim have a polyester and a co-polyester.

14. The fluid filter of claim 12 wherein said bicomponent fibers of said second support scrim have a polyester and a polyethylene.

15. The fluid filter of claim 2 wherein said second support scrim is multilayered having a first and second layer, said first layer being bonded to said expanded polytetrafluoroethylene, said second layer being bonded to said first layer.

16. The fluid filter of claim 15 wherein said first layer of said second support scrim has bicomponent fibers with a polyester and a polyethylene and said second layer of said second support scrim has bicomponent fibers with a polyester and a co-polyester.

17. The fluid filter of claim 1 wherein said media has a Gurley stiffness of at least 500 mg.

18. The fluid filter of claim 1 wherein said media has an efficiency of at most 99.97% at 0.3μ.

19. The fluid filter of claim 1 wherein said media has an efficiency of at least 99.97% at 0.3μ.

20. The fluid filter of claim 1 wherein said media has an efficiency in a range of 40% to 99.999995% at a most penetrating particle size.

21. The fluid filter of claim 1 wherein said media has a permeability in a range of 2 to 400 cfm/sq ft.

22. The fluid filter of claim 1 wherein said first surface is said upstream surface.

23. The fluid filter of claim 1 wherein said first surface is said downstream surface.

24. The fluid filter of claim 1 wherein said first support scrim and said layer of expanded polytetrafluoroethylene have a polymeric material therebetween providing bonding between said first support scrim and said expanded polytetrafluoroethylene.

25. The fluid filter of claim 2 wherein said media has a Gurley stiffness of at least 500 mg.

26. The fluid filter of claim 2 wherein said media has an efficiency of at most 99.97% at 0.3μ.

27. The fluid filter of claim 2 wherein said media has an efficiency of at least 99.97% at 0.3μ.

28. The fluid filter of claim 2 wherein said media has an efficiency in a range of 40% to 99.999995% at a most penetrating particle size.

29. The fluid filter of claim 2 wherein said media has a permeability in a range of 2 to 400 cfm/sq ft.

30. The fluid filter of claim 2 wherein said first surface is said upstream surface.

31. The fluid filter of claim 2 wherein said first surface is said downstream surface.

32. The fluid filter of claim 2 wherein said second support scrim and said layer of expanded polytetrafluoroethylene have a polymeric material therebetween providing bonding between said second support scrim and said expanded polytetrafluoroethylene.

33. A fluid filter having a media comprising:
a carded pleatable first support scrim having a melt bonded non-woven material or a fuse bonded non-woven material said first support scrim having a Gurley stiffness of at least 500 mg;

a layer of expanded polytetrafluoroethylene having a first surface bonded to said first support scrim; and said fluid filter media being pleated, self-supporting and having an efficiency greater than about 40% and less than 99.97% efficient at 0.3 micron.

34. The fluid filter of claim 33 wherein said media has an efficiency is about 80%.

35. The fluid filter of claim 33 wherein said multi-layer first support scrim has a first layer bonded to said first surface of said expanded polytetrafluoroethylene, said first layer of said first support scrim having at least 30% bicomponent fibers.

36. The fluid filter of claim 35 wherein said bicomponent fibers of said first layer of said first support scrim have a polyester and a low melting portion selected from the group consisting of co-polyester and polyethylene.

37. The fluid filter of claim 35 wherein said bicomponent fibers of said first layer of said first support scrim have a polyester and a polyethylene, said multi-layer first support scrim having a second layer bonded to said first layer, said second layer having at least 30% bicomponent fibers with a polyester and a co-polyester.

38. The fluid filter of claim 33 having a second support scrim bonded to a second surface of said expanded polytetrafluoroethylene, said second support having at least 30% bicomponent fibers.

39. The fluid filter of claim 38 wherein said bicomponent fibers of said second support scrim have a polyester and a low melting portion selected from the group consisting of co-polyester and polyethylene.

40. The fluid filter of claim 39 wherein said second support scrim has a first and second layer, said first layer of said second support scrim being bonded to said expanded polytetrafluoroethylene and having at least 30% bicomponent fibers with a polyester and a polyethylene, said second layer of said support scrim having at least 30% bicomponent fibers with a polyester and a co-polyester.

41. A fluid filter media comprising at least one pleatable carded scrim layer with a Gurley stiffness of at least 500 mg bonded to an ePTFE layer, said filter media having an efficiency between about 70% and 90%, said at least one scrim layer having melt bonded non-woven or fuse bonded non-woven bicomponent fibers, said filter media being pleated and self-supporting.

42. The fluid filter media of claim 41 wherein said at least one scrim layer has at least 30% bicomponent fibers.

43. The fluid filter media of claim 41 wherein said bicomponent fibers of said at least one scrim layer have a polyester and a low melting portion selected from the group consisting of co-polyester and polyethylene.

* * * * *